United States Patent
Katayama

(10) Patent No.: US 11,440,436 B2
(45) Date of Patent: Sep. 13, 2022

(54) VEHICLE

(71) Applicant: TOYOTA JIDOSHA KABUSHIKI KAISHA, Toyota (JP)

(72) Inventor: Junta Katayama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/927,314

(22) Filed: Jul. 13, 2020

(65) Prior Publication Data

US 2021/0061131 A1 Mar. 4, 2021

(30) Foreign Application Priority Data

Aug. 26, 2019 (JP) ............... JP2019-153940

(51) Int. Cl.
*B60L 58/26* (2019.01)
*B60L 50/64* (2019.01)
*B60K 1/04* (2019.01)

(52) U.S. Cl.
CPC ............... *B60L 58/26* (2019.02); *B60K 1/04* (2013.01); *B60L 50/64* (2019.02); *B60K 2001/0438* (2013.01)

(58) Field of Classification Search
CPC .......... B60L 58/26; B60L 50/64; B60K 1/04; B60K 2001/0438; B60K 2001/005; B60K 11/02; B60K 13/04; B60K 6/40; B60K 6/28; Y02T 10/70; F01P 3/12; F01P 2050/24; F01N 13/08; F01N 2260/024; B60Y 2200/92; B60Y 2306/05
USPC .......................................................... 62/239
See application file for complete search history.

(56) References Cited

U.S. PATENT DOCUMENTS

| | | | | |
|---|---|---|---|---|
| 5,624,003 | A * | 4/1997 | Matsuki | H01M 10/625 180/68.5 |
| 7,921,662 | B2 * | 4/2011 | Kubo | F28D 7/14 62/323.3 |
| 9,796,293 | B2 * | 10/2017 | Ito | H01M 50/20 |
| 2005/0204763 | A1 * | 9/2005 | Smith | B60H 1/00014 62/239 |
| 2007/0007060 | A1 * | 1/2007 | Ono | B62D 25/025 180/65.31 |
| 2012/0073295 | A1 * | 3/2012 | Enokijima | F01K 23/101 60/660 |
| 2012/0178576 | A1 * | 7/2012 | Beechie | F01N 5/02 475/160 |
| 2013/0298586 | A1 * | 11/2013 | Hwang | B60L 3/0046 429/61 |
| 2014/0231158 | A1 | 8/2014 | Tohara et al. | |
| 2015/0089943 | A1 * | 4/2015 | Hussain | F01N 5/02 903/905 |

(Continued)

FOREIGN PATENT DOCUMENTS

| | | | | |
|---|---|---|---|---|
| JP | 5713115 | B2 * | 5/2015 | ............ B60K 1/04 |
| JP | 5713115 | B2 | 5/2015 | |

*Primary Examiner* — Eric S Ruppert
*Assistant Examiner* — Kirstin U Oswald
(74) *Attorney, Agent, or Firm* — Sughrue Mion, PLLC

(57) ABSTRACT

A vehicle includes a housing case, a power storage module provided in the housing case, an electronic device provided in the housing case, an exhaust pipe disposed laterally of the housing case, and a cooling circuit including a cooling pipe through which refrigerant circulates. A portion of the cooling pipe is located between the electronic device and the exhaust pipe.

8 Claims, 4 Drawing Sheets

(56) References Cited

U.S. PATENT DOCUMENTS

2016/0226041 A1\* 8/2016 Jackson .................. B60K 1/04
2018/0111499 A1\* 4/2018 Wada .................. B62D 21/157

\* cited by examiner

VEHICLE

This nonprovisional application is based on Japanese Patent Application No. 2019-153940 filed on Aug. 26, 2019 with the Japan Patent Office, the entire contents of which are hereby incorporated by reference.

BACKGROUND

Field

The present disclosure relates to a vehicle.

Description of the Background Art

Japanese Patent No. 5713115 discloses an exhaust pipe structure for a hybrid car comprising an exhaust pipe and a driving battery pack that are mounted under a floor of a vehicle body. In the exhaust pipe structure disclosed in Japanese Patent No. 5713115, the exhaust pipe is positioned along one side surface of the battery pack.

SUMMARY

In the exhaust pipe structure disclosed in Japanese Patent No. 5713115, since the exhaust pipe is disposed along one side surface of the battery pack, an electronic device provided in the battery pack is easily heated by heat transferred through the exhaust pipe.

The present disclosure has an object to provide a vehicle including a configuration capable of restraining heating of an electronic device provided in a battery pack.

A vehicle includes a housing case, a power storage module provided in the housing case, an electronic device provided in the housing case, an exhaust pipe disposed laterally of the housing case, and a cooling circuit including a cooling pipe through which refrigerant circulates. A portion of the cooling pipe is located between the electronic device and the exhaust pipe.

With the above configuration, since a portion of the cooling pipe is located between the electronic device and the exhaust pipe, transfer of heat from the exhaust pipe toward the electronic device is hindered by the portion of the cooling pipe, thus restraining heating of the electronic device.

In the vehicle, the cooling circuit may include a module cooling portion that is disposed to face the power storage module and cools the power storage module and a device cooling portion that is disposed to face the electronic device and cools the electronic device. In a direction in which the refrigerant flows, the device cooling portion may be located upstream of the module cooling portion.

With the above configuration, the refrigerant can cool the electronic device before the refrigerant performs heat exchange with the power storage module.

In the vehicle, in a direction in which exhaust flows through the exhaust pipe, the electronic device may be located upstream of the power storage module.

With the above configuration, since the electronic device is located close to the upstream portion of the exhaust pipe (i.e., a higher-temperature portion of the exhaust pipe) than the power storage module is to the upstream portion, the electronic device is easily affected by the heat from the exhaust pipe compared with the power storage module. Thus, the effect of the heat that may act on the electronic device from the exhaust pipe can be reduced more by cooling the electronic device prior to the power storage module.

In the vehicle, the cooling circuit may include a module cooling portion that is disposed to face the power storage module and cools the power storage module and a device cooling portion that is disposed to face the electronic device and cools the electronic device. In a direction in which the refrigerant flows, the device cooling portion may be located downstream of the module cooling portion.

With the above vehicle, the refrigerant can cool the power storage module before the refrigerant performs heat exchange with the device cooling portion.

In the above vehicle, the cooling circuit may include a module cooling portion that is disposed to face the power storage module and cools the power storage module, a first device cooling portion that is disposed to face the electronic device and cools the electronic device, and a second device cooling portion that is disposed to face the electronic device and cools the electronic device. In a direction in which the refrigerant flows, the first device cooling portion may be located upstream of the module cooling portion, and the second device cooling portion may be disposed downstream of the module cooling portion.

With the above configuration, the refrigerant can cool the electronic device before and after the refrigerant performs heat exchange with the power storage module.

In the vehicle, the portion of the cooling pipe may be provided in the housing case. With the above configuration, heating of the electronic device provided in the battery pack can be restrained owing to the presence of the portion of the cooling pipe, and besides, the space in the housing case can be used effectively compared with the case where the portion of the cooling pipe is provided outside of the housing case.

In the vehicle, the portion of the cooling pipe may be disposed flush with the electronic device.

With the above configuration, heating of the electronic device provided in the battery pack can be restrained more than in the case where the portion of the cooling pipe is not disposed flush with the electronic device.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
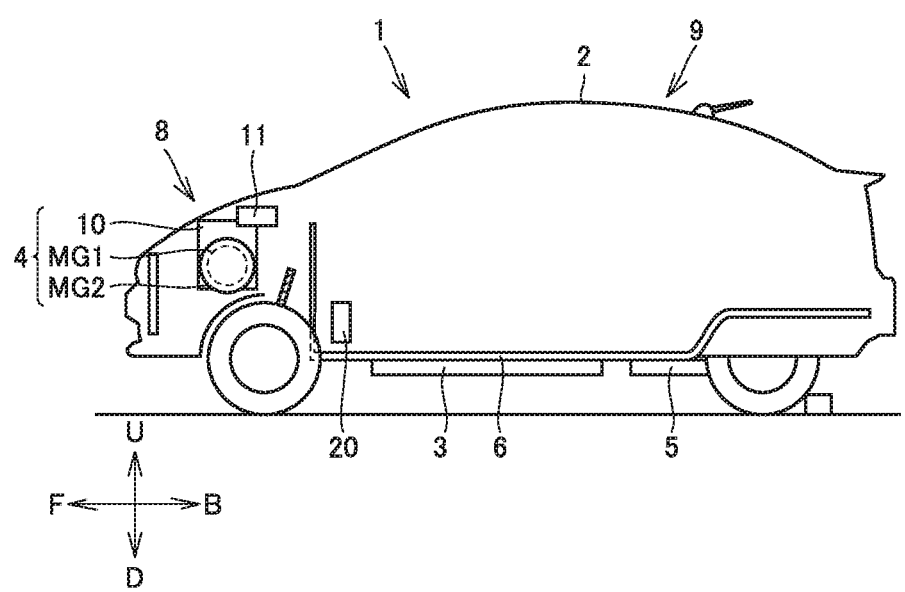
FIG. 1 schematically shows a vehicle 1 according the present embodiment.
Figure 2:
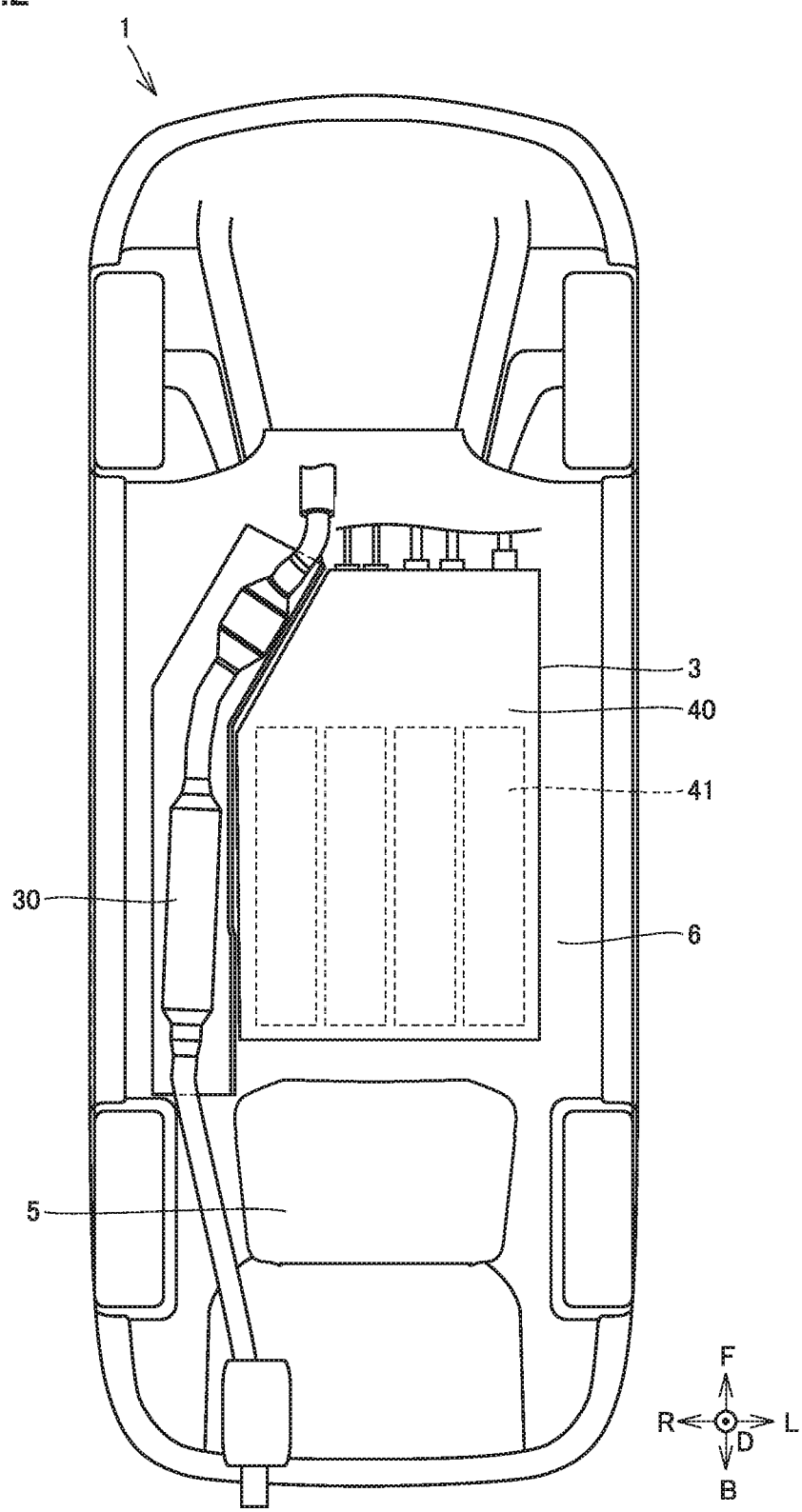
FIG. 2 shows a bottom of vehicle 1.
Figure 3:
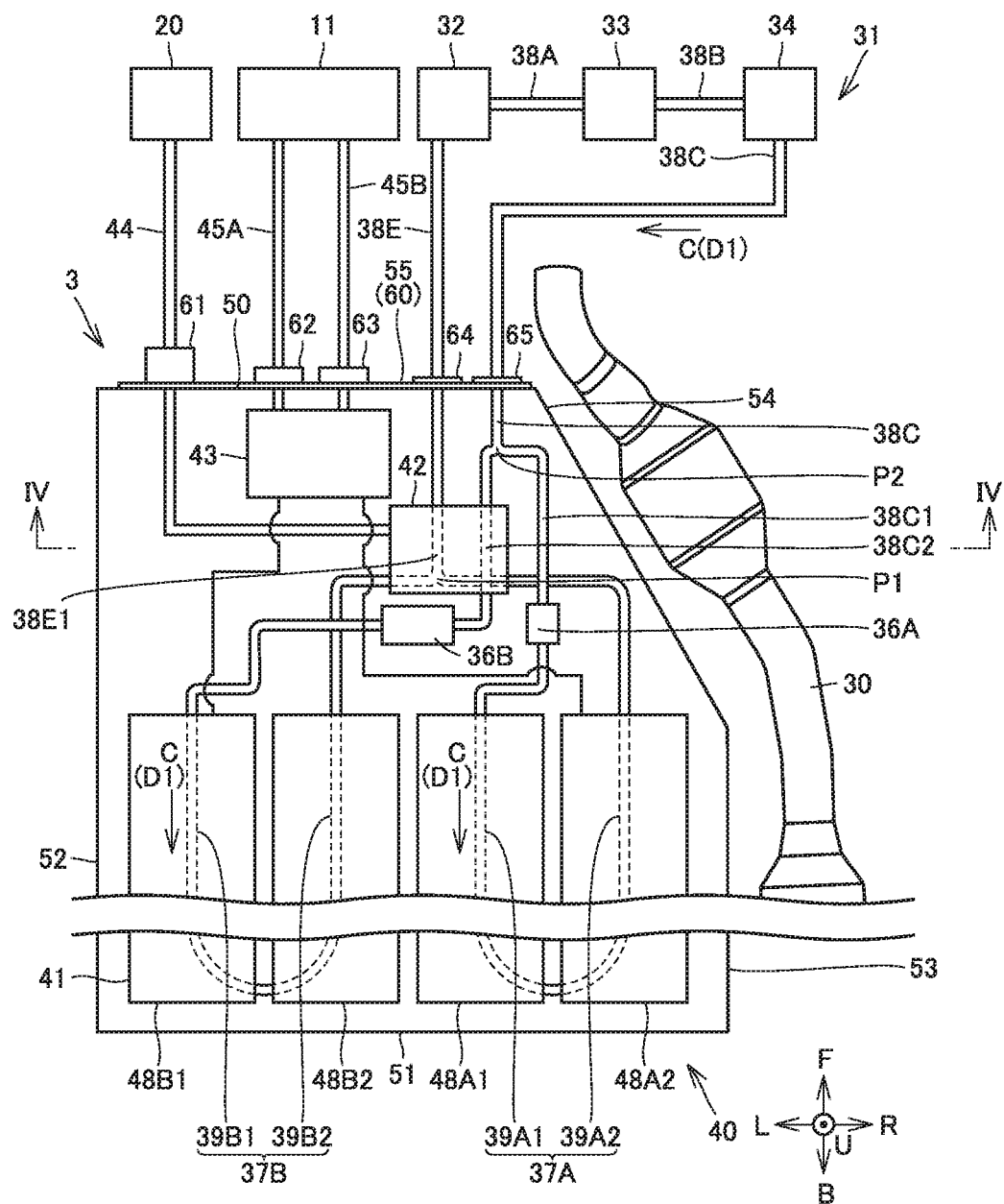
FIG. 3 is a plan view schematically showing the relation of arrangement between a battery ECU 42 and its surrounding components as viewed from above the vehicle.

A vehicle according to the present embodiment will be described with reference to FIGS. 1 to 5. Of the components shown in FIGS. 1 to 5, identical or substantially identical components will be designated by the same reference numerals, and redundant description will be omitted. In FIGS. 1 to 3, "U" indicates the up direction, "D" indicates the down direction, "F" indicates the forward direction, "B" indicates the backward direction, "L" indicates the left direction, and "R" indicates the right direction.

(Vehicle)

FIG. 1 schematically shows a vehicle 1 according to the present embodiment. FIG. 2 shows a bottom of vehicle 1. Vehicle 1 includes a vehicle main body 2, a battery pack 3, a drive device 4, a fuel tank 5, and an ECU 20. Vehicle main body 2 includes a floor panel 6 forming the bottom of vehicle 1. An engine compartment 8 and a vehicle cabin 9 are formed in vehicle main body 2. Engine compartment 8 is formed forward of vehicle cabin 9. Vehicle cabin 9 is, for example, a space that an occupant gets in, and in the example shown in FIG. 1, ECU 20 is housed in vehicle cabin 9.

Drive device 4 includes an engine 10, rotating electric machines MG1 and MG2, and a PCU 11. PCU 11 includes, for example, two inverters and a converter. One of the inverters is electrically connected to rotating electric machine MG1, and the other inverter is connected to rotating electric machine MG2. The converter is electrically connected to battery pack 3. Rotating electric machine MG2 functions as a motor that mainly rotates drive wheels, and rotating electric machine MG1 mainly functions as a generator. Engine 10 is driven on fuel supplied from fuel tank 5 to generate a drive force for rotating the drive wheels. ECU 20 controls driving of PCU 11 and engine 10.

Battery pack 3 and fuel tank 5 are provided on the lower surface of floor panel 6. Fuel tank 5 is disposed rearward of battery pack 3.

Figure 4:
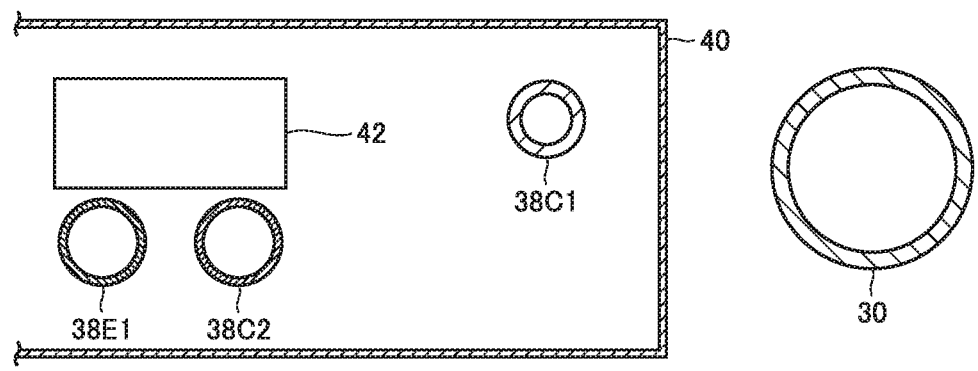
FIG. 4 is a sectional view taken along the line IV-IV in FIG. 3, which schematically shows the relation of arrangement in height direction between battery ECU 42 and a portion 38C1 of a cooling pipe.

FIG. 3 is a plan view schematically showing the relation of arrangement between a battery ECU 42 and its surrounding components as viewed from above the vehicle. FIG. 4 is a sectional view taken along the line IV-IV in FIG. 3, which schematically shows the relation of arrangement in height direction between battery ECU 42 and a portion 38C1 of a cooling pipe. Vehicle 1 includes a housing case 40. A power storage module 41, battery ECU 42 (electronic device), and a junction box 43 are provided in housing case 40.

Housing case 40 includes a front end surface 50, a rear end surface 51, a lateral surface 52, a lateral surface 53, and an inclined surface 54. In the example shown in FIG. 3, lateral surface 52 is located on the left, and lateral surface 53 and inclined surface 54 are located on the right. Inclined surface 54 is connected to an extremity of lateral surface 53, and inclined surface 54 is inclined closer to lateral surface 52 as inclined surface 54 approaches the front side.

A connecting panel 55 is attached to front end surface 50 of housing case 40. Connecting panel 55 includes a base plate 60 and a plurality of tubular sleeves 61, 62, 63, 64, and 65.

Base plate 60 is fixed to front end surface 50, and through-holes are individually formed in tubular sleeves 61, 62, 63, 64, and 65. The respective through-holes formed in tubular sleeves 61, 62, 63, 64, and 65 bring the interior space of housing case 40 and the outside of housing case 40 to be in communication with each other.

A low-voltage cable 44 is inserted through tubular sleeve 61. Low-voltage cable 44 is connected to ECU 20. A high-voltage cable 45A is inserted through tubular sleeve 62, and a high-voltage cable 45B is inserted through tubular sleeve 63. A cooling pipe 38E is inserted through tubular sleeve 64, and a cooling pipe 38C is inserted through tubular sleeve 65.

Power storage module 41 includes a plurality of power storage units 48A1, 48A2, 48B1, and 48B2, and power storage units 48A1, 48A2, 48B1, and 48B2 are spaced from each other in the width direction of vehicle 1. Each of power storage units 48A1, 48A2, 48B1, and 48B2 includes a plurality of power module cells, and the power module cells are disposed to be arranged in the front-rear direction of vehicle 1.

Battery ECU 42 and junction box 43 are provided forward of power storage module 41.

Battery ECU 42 is connected with low-voltage cable 44 including a signal line or the like, and low-voltage cable 44 electrically connects battery ECU 42 and ECU 20. Battery ECU 42 receives signals transmitted from a temperature sensor, a current sensor, and a voltage sensor provided in power storage module 41 and calculates, for example, the SOC of power storage module 41 or the like. Battery ECU 42 transmits information on the calculated SOC or the like to ECU 20 through low-voltage cable 44.

Junction box 43 is connected with high-voltage cables 45A and 45B, and high-voltage cables 45A and 45B electrically connect junction box 43 and PCU 11. A plurality of relays are provided in junction box 43 and switch the state of electrical connection between PCU 11 and power storage module 41, specifically, switch ON/OFF of the relays provided in high-voltage cables 45A and 45B. A voltage applied to low-voltage cable 44 is lower than the voltages applied to high-voltage cables 45A and 45B. Low-voltage cable 44 and high-voltage cables 45A and 45B are drawn out of housing case 40 from front end surface 50.

Vehicle 1 includes an exhaust pipe 30. Exhaust pipe 30 is disposed laterally of housing case 40. In FIG. 3, exhaust pipe 30 is disposed to face inclined surface 54 and lateral surface 53 with a spacing therebetween and is formed to extend along inclined surface 54 and lateral surface 53. Exhaust pipe 30 is connected to engine 10. Exhaust discharged from engine 10 flows through exhaust pipe 30. Herein, the exhaust in exhaust pipe 30 flows from the vehicle front side (the upper side in the sheet of paper of FIG. 3) toward the vehicle rear side (the lower side in the sheet of paper of FIG. 3). As exhaust flows into exhaust pipe 30 from engine 10, the temperature of exhaust pipe 30 rises. Exhaust pipe 30 is likely to have a temperature distribution in which the front side has a relatively high temperature and the rear side has a relatively low temperature. Heat is transferred from exhaust pipe 30 to housing case 40 of battery pack 3, which is likely to heat battery ECU 42 (electronic device) provided in battery pack 3.

Vehicle 1 includes a cooling circuit 31. Cooling circuit 31 includes a compressor 32, a condenser 33, a receiver tank 34, expansion valves 36A and 36B, module cooling portions 37A and 37B, and a plurality of cooling pipes 38A, 38B, 38C, and 38E. Refrigerant C circulates through cooling circuit 31.

Module cooling portions 37A and 37B are disposed to face power storage module 41, and cool power storage module 41.

Module cooling portion 37A includes an upstream pipe 39A1 and a downstream pipe 39A2. Refrigerant C flows through module cooling portion 37A in a circulation direction D1, and downstream pipe 39A2 is disposed downstream of upstream pipe 39A1 in circulation direction D1. Upstream pipe 39A1 is disposed on the lower surface of power storage unit 48A1, and downstream pipe 39A2 is disposed on the lower surface of power storage unit 48A2.

Module cooling portion 37B includes an upstream pipe 39B1 and a downstream pipe 39B2. Refrigerant C flows through module cooling portion 37B in circulation direction D1, and downstream pipe 39B2 is disposed downstream of upstream pipe 39B1 in circulation direction D1. Upstream pipe 39B1 is disposed on the lower surface of power storage unit 48B1, and downstream pipe 39B2 is disposed on the lower surface of power storage unit 48B2.

Cooling pipe 38C includes a portion 38C1 of cooling pipe 38C and a device cooling portion 38C2 (first device cooling portion). Portion 38C1 of cooling pipe 38C is a component of cooling pipe 38C, and cooling pipe 38C diverges at a diverging point P2 into portion 38C1 of cooling pipe 38C and device cooling portion 38C2.

Portion 38C1 of cooling pipe 38C is located between battery ECU 42 and exhaust pipe 30. Portion 38C1 of cooling pipe 38C may be provided in housing case 40 or provided outside of housing case 40.

Device cooling portion 38C2 is disposed to face battery ECU 42 and cools battery ECU 42. In the direction in which refrigerant C flows, device cooling portion 38C2 is located upstream of upstream pipe 39B1 of module cooling portion 37B.

Cooling pipe 38E includes a device cooling portion 38E1 (second device cooling portion). Device cooling portion 38E1 is disposed to face battery ECU 42 and cools battery ECU 42. In the direction in which refrigerant C flows, device cooling portion 38E1 is located downstream of downstream pipe 39A2 of module cooling portion 37A and downstream pipe 39B2 of module cooling portion 37B. Downstream pipe 39A2 and downstream pipe 39B2 are connected to cooling pipe 38E at a merging end P1, which is located at the downstream end of downstream pipe 39A2 and the downstream end of downstream pipe 39B2. Battery ECU 42 is disposed above downstream pipes 39A2 and 39B2, merging end P1, and device cooling portion 38E1. Cooling pipe 38E is drawn out of housing case 40 from the inside of housing case 40.

Compressor 32 and condenser 33 are connected by cooling pipe 38A, and condenser 33 and receiver tank 34 are connected by cooling pipe 38B. Receiver tank 34 and expansion valves 36A and 36B are connected by cooling pipe 38C. Condenser 33 performs heat exchange between outside air and refrigerant C to cool refrigerant C. Consequently, refrigerant C enters the high-temperature, high-voltage liquid state. Receiver tank 34 separates gas and supplies refrigerant C in the form of liquid to expansion valves 36A and 36B.

Expansion valve 36A is connected with module cooling portion 37A, and expansion valve 36B is connected with module cooling portion 37B. Expansion valves 36A and 36B adiabatically expand the supplied refrigerant C in the form of high-temperature, high-voltage liquid to turn refrigerant C into low-temperature, low-voltage mist.

Refrigerant C which has entered the low-temperature, low-voltage state in expansion valves 36A and 36B flows through module cooling portions 37A and 37B in circulation direction D1. Refrigerant C flowing through module cooling portion 37A passes through upstream pipe 39A1 and then flows through downstream pipe 39A2. As refrigerant C flows through upstream pipe 39A1, power storage unit 48A1 is cooled. As refrigerant C flows through downstream pipe 39A2, power storage unit 48A2 is cooled. On the other hand, in the course of flow of refrigerant through upstream pipe 39A1 and downstream pipe 39A2, a portion of refrigerant C turns into low-temperature, low-voltage gas. Herein, when passing through upstream pipe 39A1, refrigerant C in the form of mist (liquid) has a percentage by weight higher than that of refrigerant C in the form of gas.

At arrival of refrigerant C at merging end P1, refrigerant C has contained refrigerant C in the form of low-temperature, low-voltage gas and refrigerant C in the form of low-temperature, low-voltage mist mixed together, and refrigerant C in the form of mist has a percentage by weight greater than the percentage by weight of refrigerant C in the form of gas.

Similarly, refrigerant C flowing through module cooling portion 37B passes through upstream pipe 39B1 and then flows through downstream pipe 39B2. As refrigerant C passes through upstream pipe 39B1, power storage unit 48B1 is cooled. As refrigerant C flows through downstream pipe 39B2, power storage unit 48B2 is cooled. On the other hand, in the course of flow of refrigerant C through upstream pipe 39B1 and downstream pipe 39B2, a portion of refrigerant C turns into low-temperature, low-voltage gas. Herein, after passing through upstream pipe 39B1, refrigerant C in the form of mist (liquid) has a percentage by weight greater than that of refrigerant C in the form of gas.

At arrival of refrigerant C at merging end P1, refrigerant C has contained refrigerant C in the form of low-temperature, low-voltage gas and refrigerant C in the form of low-temperature, low-voltage mist mixed together, and refrigerant C in the form of mist has a percentage by weight greater than the percentage by weight of refrigerant C in the form of gas.

Latent heat when refrigerant C in the form of mist turns into refrigerant C in the form of gas is considerably greater than the amount of heat which is required for the temperature of refrigerant C in the form of liquid to rise.

For refrigerant C flowing under battery ECU 42 through downstream pipe 39A2 and downstream pipe 39B2, the percentage by weight of refrigerant C in the form of liquid is greater than the percentage by weight of refrigerant C in the form of gas, and accordingly, battery ECU 42 can be satisfactorily cooled. In cooling pipe 38E, refrigerant C is in the form of low-temperature, low-voltage gas in the portion downstream of battery ECU 42 in circulation direction D1.

(Operation and Effect)

In the case where the exhaust pipe of the vehicle is disposed laterally of the housing case, heat is easily transferred from the exhaust pipe to the housing case. When the battery ECU that controls the power storage device provided in the housing case is heated by the heat transferred from the exhaust pipe, the control operation of the battery ECU may be affected. The control operation may be affected by the heat from the exhaust pipe, as well as waste heat of the engine. In particular, it is essential to mount an exhaust pipe in a plug-in hybrid vehicle because an engine is mounted in the plug-in hybrid vehicle. In the case of a large-size battery pack, however, a battery ECU is frequently mounted under the floor of the vehicle, and accordingly, the distance between the exhaust pipe and the battery ECU is likely to be small.

In vehicle 1 of the embodiment, since portion 38C1 of cooling pipe 38C is located between battery ECU 42 and exhaust pipe 30, heating of battery ECU 42 by the heat from exhaust pipe 30 can be restrained owing to the presence of portion 38C1 of cooling pipe 38C.

Figure 5:
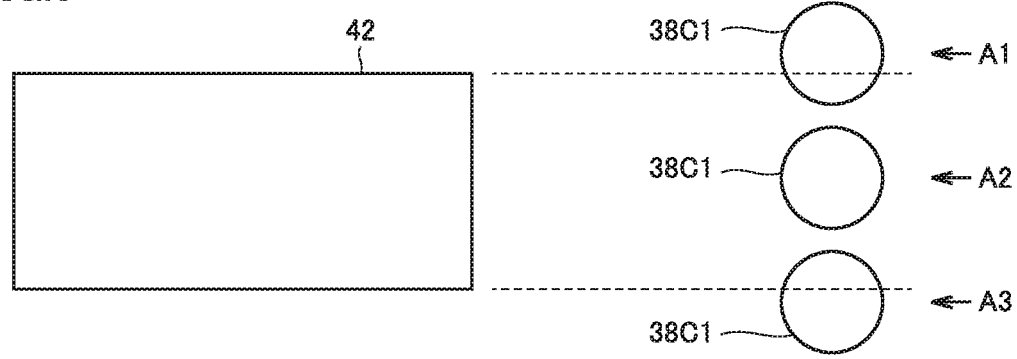
FIG. 5 schematically shows a pattern of the relation of arrangement in height direction between battery ECU 42 and portion 38C1 of the cooling pipe.

FIG. 5 schematically shows a pattern of the relation of arrangement in height direction between battery ECU 42 and portion 38C1 of cooling pipe 38. It suffices that portion 38C1 of cooling pipe 38C is disposed flush with battery ECU 42.

In the case where portion 38C1 of cooling pipe 38C is located at a position A1 shown in FIG. 5, a projection image formed when battery ECU 42 is projected horizontally toward portion 38C1 of cooling pipe 38C partially overlaps the lower side of portion 38C1 of cooling pipe 38C. In the case where portion 38C1 of cooling pipe 38C is located at a position A2 shown in FIG. 5, a projection image formed when battery ECU 42 is projected horizontally toward portion 38C1 of cooling pipe 38C entirely overlaps portion 38C1 of cooling pipe 38C. In the case where portion 38C1 of cooling pipe 38C is located at a position A3 shown in FIG. 5, a projection image formed when battery ECU 42 is projected horizontally toward portion 38C1 of cooling pipe 38C partially overlaps the upper side of portion 38C1 of cooling pipe 38C.

At any of positions A1, A2, and A3 shown in FIG. 5, heat from exhaust pipe 30 toward battery ECU 42 is easily blocked by portion 38C1 of cooling pipe 38C, thus restraining heating of battery ECU 42 by the heat from exhaust pipe 30. Even in the case where portion 38C1 of cooling pipe 38C is not entirely disposed flush with battery ECU 42 (i.e., even in the case where portion 38C1 of cooling pipe 38C and battery ECU 42 are disposed out of alignment in height direction), since portion 38C1 of cooling pipe 38C is located between battery ECU 42 and exhaust pipe 30, the above effect can be achieved unlike in the case where portion 38C1 of cooling pipe 38C is not disposed between battery ECU 42 and exhaust pipe 30.

In the case where cooling circuit 31 includes device cooling portion 38C2, refrigerant can cool battery ECU 42 before refrigerant performs heat exchange with power storage module 41. Thus, the device can be cooled more efficiently by cooling battery ECU 42 at least upstream of power storage module 41.

In the present embodiment, battery ECU 42 is located upstream of power storage module 41 in the direction in which exhaust flows through exhaust pipe 30. In other words, exhaust pipe 30 has an upstream portion and a downstream portion in the direction in which exhaust flows, battery ECU 42 is disposed near the upstream portion, and power storage module 41 is disposed near the downstream portion. With this configuration, battery ECU 42 is located closer to the upstream portion of exhaust pipe 30 (i.e., a higher-temperature portion of exhaust pipe 30) than power storage module 41 is to the upstream portion, and accordingly, battery ECU 42 is easily affected by the heat from exhaust pipe 30 compared with power storage module 41. The cooling capacity by means of the cooling pipe is higher on the upstream side than on the downstream side in the direction in which refrigerant flows through the cooling pipe. Thus, the effect of heat that may act on battery ECU 42 from exhaust pipe 30 can be reduced more by cooling battery ECU 42 prior to power storage module 41, that is, by cooling battery ECU 42 by the portion of the cooling pipe which has higher cooling capacity.

In the case where cooling circuit 31 includes device cooling portion 38E1, refrigerant can cool power storage module 41 before the refrigerant performs heat exchange with battery ECU 42, and accordingly, battery ECU 42 can be cooled without impairing the cooling capability of cooling power storage module 41 by cooing battery ECU 42 at least downstream of power storage module 41.

In the case where cooling circuit 31 includes both of device cooling portion 38C2 and device cooling portion 38E1, refrigerant can cool battery ECU 42 before and after the refrigerant performs heat exchange with power storage module 41, thus cooling battery ECU 42 more efficiently.

In the case where portion 38C1 of cooling pipe 38C is provided in housing case 40, the space in housing case 40 can be used effectively, thus restraining heating of battery ECU 42 provided in housing case 40 by the heat transferred from exhaust pipe 30 to housing case 40.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle comprising:
   a housing case;
   a battery pack provided in the housing case;
   a battery electronic control unit provided in the housing case;
   an exhaust pipe disposed laterally of the housing case; and
   at least one cooling pipe through which refrigerant circulates,
   wherein
   a portion of the at least one cooling pipe is located between the battery electronic control unit and the exhaust pipe,
   the at least one cooling pipe comprises:
      a module cooling pipe disposed to face the battery pack and configured to cool the battery pack,
      a device cooling pipe disposed to face the battery electronic control unit and configured to cool the battery electronic control unit, and
      wherein, in a direction in which the refrigerant flows, an expansion valve disposed at an inlet of the module cooling pipe.

2. The vehicle according to claim 1, wherein
   in the direction in which the refrigerant flows, the device cooling pipe is located upstream of the module cooling pipe.

3. The vehicle according to claim 2, wherein in a direction in which exhaust flows through the exhaust pipe, the battery electronic control unit is located upstream of the battery pack.

4. The vehicle according to claim 1, wherein
   in the direction in which the refrigerant flows, the device cooling pipe is located downstream of the module cooling pipe.

5. The vehicle according to claim 1, wherein
   the at least one cooling pipe further comprises:
      a second device cooling pipe that is disposed to face the battery electronic control unit and cools the battery electronic control unit, and
   in a direction in which the refrigerant flows, the device cooling pipe is located upstream of the module cooling pipe, and the second device cooling pipe is located downstream of the module cooling pipe.

6. The vehicle according to claim 1, wherein the portion of the at least one cooling pipe is provided in the housing case.

7. The vehicle according to claim 1, wherein the portion of the at least one cooling pipe is disposed flush with the battery electronic control unit.

8. The vehicle according to claim 1, wherein in a direction in which exhaust flows through the exhaust pipe, the battery electronic control unit is located upstream of the battery pack.

* * * * *